(12) United States Patent
Merrill (10) Patent No.: US 6,614,432 B1
(45) Date of Patent: Sep. 2, 2003

(54) IMAGE RENDERING TECHNIQUE

(75) Inventor: Peter Merrill, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/293,593

(22) Filed: Apr. 16, 1999

(51) Int. Cl.$^7$ .............................................. G06T 17/00
(52) U.S. Cl. ...................... 345/428; 345/643; 345/468
(58) Field of Search .................................. 345/419, 420, 345/422, 428, 443, 442, 467, 468, 469, 469.1, 470, 471, 581, 582, 586, 589, 611, 612, 614, 636, 643, 644, 645, 694, 698, 699, 204; 358/1.2, 1.9, 456; 382/168, 171, 172, 169, 170

(56) References Cited

U.S. PATENT DOCUMENTS

| | | | |
|---|---|---|---|
| 5,233,336 A | 8/1993 | Byron et al. ................. 340/748 |
| 5,255,357 A | 10/1993 | Byron et al. ................. 395/151 |
| 5,295,236 A | 3/1994 | Bjorge et al. ................ 395/134 |
| 5,579,030 A | 11/1996 | Karow ........................ 345/143 |
| 5,581,680 A | * 12/1996 | Sfarti et al. ................. 195/143 |
| 5,714,972 A | 2/1998 | Tanaka et al. ............... 345/121 |
| 5,717,499 A | 2/1998 | Johnson et al. ............. 358/444 |
| 5,719,595 A | 2/1998 | Hoddie et al. .............. 345/136 |
| 5,778,403 A | 7/1998 | Bangs ......................... 707/527 |
| 5,796,409 A | 8/1998 | Hersch et al. ............... 345/468 |
| 5,801,691 A | 9/1998 | Dahl ........................... 345/339 |
| 5,855,015 A | 12/1998 | Shoham ......................... 707/5 |
| 5,867,173 A | 2/1999 | Ballard et al. ............... 345/468 |
| 5,867,606 A | 2/1999 | Tretter ........................ 382/261 |
| 5,880,734 A | 3/1999 | Light .......................... 345/419 |
| 5,943,063 A | * 8/1999 | Dowling ...................... 345/471 |
| 6,072,941 A | * 6/2000 | Suzuki et al. ............... 395/143 |

OTHER PUBLICATIONS

Foley et al (Computer Graphics: Principles and Practice: Second Edition in C; Jul. 1997.*
R.D. Hersch, "Visual and Technical Aspects of Type," Cambridge University press, 1993, pp. 78–146.
"Microsoft Clear Type Overview," Microsoft, Nov. 1998, 2 pgs., downloaded from www.microsoft.com/PressPass/Press/1998/Nov98/ClearType.
Adobe, U.S. patent application Ser. No. 08/591,924, filed Jan. 25, 1996.
Adobe, U.S. patent application Ser. No. 08/907,338, filed Aug. 6, 1997.

* cited by examiner

*Primary Examiner*—Mano Padmanabhan
(74) *Attorney, Agent, or Firm*—Fish & Richardson P.C.

(57) ABSTRACT

A method renders a graphical object for display on a destination raster of pixels having a destination resolution by rendering the graphical object at a resolution higher than the destination resolution to generate one or more pieces, the pieces in the aggregate representing the graphical object at the higher resolution, and each of the pieces having a position with respect to the destination raster, whereby each piece overlaps one or more pixels; for each of the pieces, calculating a contribution made by the piece to each of one or more pixels according to a selected algorithm, the algorithm being selected by a process applying a plurality of factors; and aggregating all the contributions made to each pixel to determine a value for the pixel.

32 Claims, 9 Drawing Sheets

IMAGE RENDERING TECHNIQUE

BACKGROUND

The present invention relates generally to systems and methods for generating an image for viewing on a computer display.

In many computer systems, it is common to represent and convey information to a user through digital images. These images may take a variety of forms such as alphanumeric characters and graphs and other pictorial representations. The digital images are conveyed to users on graphical rendering devices, such as video monitors, printers and the like. Typically, the digital images are stored in digital form, manipulated and then displayed on a monitor or printed on an output device such as a printer.

Typically, a computer's printer can provide resolution that is significantly higher than the resolution provided by its display screen. For example, a standard VGA display screen provides 96 dots-per-inch (dpi) resolution, whereas a conventional laser printer provides 600 dpi resolution, and professional-quality printers can provide still higher resolution, for example, 1200 dpi, 2400 dpi or more.

In addition to having lower resolution than printer resolution, display screens also vary in size. For instance, a conventional desktop screen may have up to 2K×2K display resolution, while the screens of hand held computers may be limited to a resolution of 160×160. This low resolution is due to the small size of these devices.

The use of a small display requires the use of small font characters or abbreviations in order to present visual information to the user of the device. This makes the displayed data difficult to read or interpret. However, increasing readability by increasing the display size conflicts with the desire for portability in hand held computers.

Additionally, a new trend in user interface provides immersive 3D environments in which the viewer is given the impression of being brought into and navigating within a 3D environment. One recent use of immersive 3D graphics is virtual reality (VR), which attempts to give the viewer the impression of being inside a 3D representation of a real or imaginary place. However, a viewer of a VR system may experience "tunnel vision," in which the video monitor appears to be window placed several feet from the viewer through which he or she views objects and places on the other side of the window. This limits the viewer's field to a few degrees, eliminating most of the normal field of vision. To overcome tunnel vision, a display with a wide field of view is used. In these environments, even though the VR display may have high resolution, characters are typically displayed poorly in the wide field of view.

Due to the wide range in size and resolution of display devices, the display of text or graphics may vary from the screen of one platform to another. Further, discrepancies exist between the appearance of the screen and the appearance of a printer's hardcopy. These discrepancies can confuse and frustrate the user.

In general, to display text on a pixel-oriented display device, a computer system utilizes one or more fonts. A font is a collection of characters designed by a typographer in a consistent style. Specifically, a typographer designs an outline for each glyph of the font, including characters, numbers, punctuation, and any other images for the font.

A problem develops when characters such as the Roman letters "A", "B", or "C", or other glyphs having slanted and/or curved portions, are to be rendered in typeface quality on a resolution-limited display device. The slanted and/or curved edge portions of the images cannot be rendered in ideal form if the resolution of the bit-mapped rendering apparatus or the resolution of a corresponding, bit-mapped display media is below a very high value (e.g., below 300 dots per inch).

In traditional computer font rendering, each pixel is either "on," appearing as a tiny individual black square, or "off." Some letters appear jagged on the computer screen because they are formed from many of these tiny squares. The finite resolution of many display devices can give the rendition of the slanted and/or curved portions of glyphs such as "A", "B", "C", a jagged appearance instead of a desired smooth appearance.

Various techniques have been developed to attempt to address the problems engendered by resolution differences. One approach called hinting is described in U.S. Pat. No. 5,796,409 where grey scale characters are generated using a hinted character outline description whose hints include control information indicating the points which define the location of bars, of serifs, of curved character parts and of other character elements such as terminals. Hints may also be used to describe which portions of the characters should be displaced and stretched in order to modify the width and the position (phase) of the different character elements relative to the pixel grid. At rendering time, contrast control is obtained by applying grey scale—specific modifications to the character outline, using the hinting information. This set of modifications includes the displacement of horizontal and vertical bar boundaries, with one boundary of each bar placed on a pixel boundary, thereby producing one high-contrast single edge. It also includes possible enlargement of bars and curved stems in order to respect a minimal width and to ensure that all important character parts, even at small sizes, have a sufficiently strong appearance. It further includes the phase placement of curved stems on the grid, in order to produce similar grey intensity profiles throughout similar curved stems.

In hinting, characteristics of the original font design are identified and the outline of the character is adjusted to insure that important characteristics will be preserved when the character outline is rendered in different sizes on different devices. Common hinting goals include consistent stem weights, consistent intensity, even spacing, and the elimination of pixel dropouts. However, at small sizes, the characters tend to loose their shape and readability, since key parts of a character's shape are lost as the character is fitted onto a reduced number of pixels.

Another technique for improving the quality of small image display is generally referred to as "anti-aliasing". One form of anti-aliasing, which is referred to here as "grey scaling", modulates the intensity or grey scale value of certain individual pixels that are partially overlapped by the image when such pixels are found at and/or near slanted/curved edges of an image. The intensity modulation gives such edges a smooth appearance. However, this technique causes the character to take on a fuzzy appearance on the screen.

SUMMARY

In one aspect, the invention relates to systems and methods for rendering a graphical object for display on a destination raster of pixels having a destination resolution. The graphical object is displayed by rendering the graphical object at a resolution higher than the destination resolution to generate one or more pieces, the pieces in the aggregate representing the graphical object at the higher resolution, and each of the pieces having a position with respect to the destination raster, whereby each piece overlaps one or more pixels. Next, for each of the pieces, the invention calculates a contribution made by the piece to each of one or more pixels according to a selected algorithm, the algorithm being selected by a process applying a plurality of factors; and aggregates all the contributions made to each pixel to determine a value for the pixel.

Implementations of the invention include one or more of the following. The plurality of factors includes the positional relationship of the piece to the raster grid. The plurality of factors also include a factor selected from a group consisting of the positional relationship of the piece to an object bounding box, the positional relationship of the piece to a glyph x-height, the positional relationship of the piece to a glyph cap-height, the relationship of the size of the piece to a font stem width, the presence of a pixel in a row or column associated with a high horizontal or vertical density of the graphical object, the position of the piece relative to a boundary of an adjacent object, and the number of pixels of the destination grid overlapped by the piece. The graphical object can be a glyph. The rendering can be done at a high resolution to generate pieces so that any pair of pieces that are adjacent in a first direction have at least a minimum distance between them. The first direction can be a vertical direction or a horizontal direction. Each piece can be a run with a start position and a stop position. The piece's contribution to a pixel can a linear function of the amount of the pixel that the piece overlaps if the piece overlaps four or more pixels. If the piece overlaps three or fewer pixels, a calculation that makes adjustments to the contribution according to one or more factors can be done. One of the factors includes whether the piece falls within one pixel. Other factors include whether the piece straddles two pixels, three pixels, or more than three pixels. The graphical object can be a glyph from a font having a stem width and wherein one of the factors includes whether the piece is has a substantial width relative to the stem width. The width can be treated as being substantial if it is at least 75% of the stem width. The contribution to a pixel can be enhanced if the pixel is in a destination raster row or column having a vertical or horizontal density histogram region that is higher than average. The vertical or horizontal density histogram can be calculated from the higher resolution rendering of the graphical object and a histogram region can be deemed higher than average at points where the height is at least twice the average histogram height. For a graphical object with a large vertical component, the invention can determine from the histogram whether a piece overlaps the large vertical component of the graphical object. The invention can eliminate one or more pieces to enhance the separation of two graphical objects. In one implementation, the one or more pieces can be eliminated to enhance a vertical separation of two graphical objects. The invention can also move, delete and add new pieces to an array of pieces. The invention can sharpen the image in the destination raster of pixels. The sharpening step can set the pixel value to a maximum value if the pixel value exceeds a predetermined maximum threshold, or set the value of a pixel to a minimum value if the pixel value is less than a predetermined minimum threshold. In one embodiment, at least one pixel receives contributions calculated according to two or more distinct algorithms.

Advantages of the invention include one or more of the following. The invention retains features most important for readability of graphical objects when they are fitted onto a reduced number of pixels. Readability relates to the ease with which a reader can comprehend the meaning of the words on the page of a document.

Moreover, the graphical objects retain their sharp edges and contrast while minimizing potential distortions to the glyph's shape. The invention is also computationally efficient since it reduces the processing of a new color when compositing the graphical objects onto the background. The color of text on a page is preserved, which is important in color-managed systems.

The invention presents the user with more or less realistic displays portraying how a paragraph, page, document, or other text being processed will appear when displayed on a small display device such as a small LCD display of a Personal Digital Assistant ("PDA"), a low resolution printer, or a VR display such as a VR headset. The text being constructed on the screen is shown as accurately as possible as compared with a final printout. Thus, the invention supports What You See Is What You Get (WYSIWYG) functionality even on resolution-limited display devices.

Other features and advantages of the invention will be apparent from the following description, including the drawings, and from the claims.

DETAILED DESCRIPTION

Figure 1:
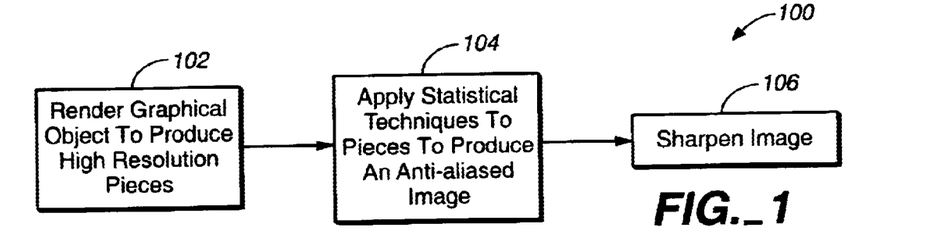
FIG. 1 is a flowchart illustrating a process for rendering images on a display device in accordance with the invention.

FIG. 1 shows a process 100 for generating an image of a graphical object suitable for viewing on a computer display having a display resolution. For the process 100, the destination resolution is the display resolution of the target output display device, which defines a grid of pixel boundaries and pixels of a size determined by the resolution. (Unless otherwise noted, reference to a pixel refers to a pixel in the display resolution grid or raster.) In one advantageous application of the process, which will be the basis of much of the following illustrative description, the graphical object is as a glyph, which is a graphical representation of a character.

The process 100 first renders the graphical object into a plurality of high resolution pieces (step 102). In one embodiment, a glyph is rendered at N times the final resolution in a vertical direction and stored as one or more runs having the same or greater horizontal resolution. N may be any suitable integer value, such as eight. The runs each indicate a start and a stop point along a horizontal line and may be organized into run arrays each corresponding to a horizontal row of runs. In alternative embodiments, the orientation of the runs and run arrays is vertical and corresponds to raster columns.

The process 100 then applies one or more processes to produce an anti-aliased image (step 104). Step 104 is described in more detail in reference to FIGS. 2–10. Finally, the process 100 sharpens the image (step 106). The image sharpening step 106 improves the appearance of a digital image by increasing the high frequency components of the image to emphasize edges and textures of the image so that the image appears sharper.

Figure 2:
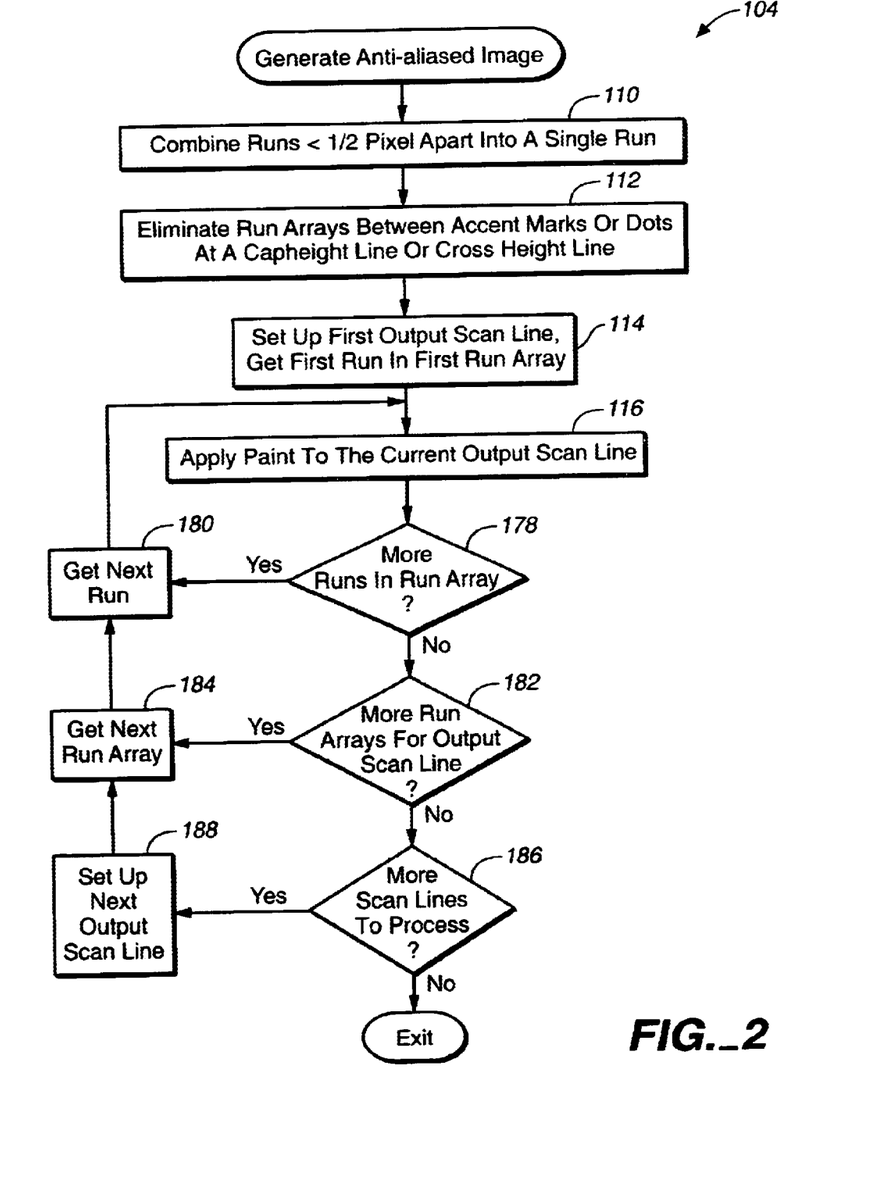
FIG. 2 is a flowchart illustrating a process for generating anti-aliased images.

Turning now to FIG. 2, step 104 is shown in more detail and in reference to an implementation based on using horizontal runs to represent the high resolution pieces. First, to complete the rendering step 102, closely-spaced runs on the same horizontal line are combined into a single run (step 110). In one embodiment, runs are closely spaced when they are within ½ of a pixel width of each other. Next, if the graphical object is a glyph in a font that provides such information, the process eliminates run arrays between accent marks or dots at a cap height line or a cross height line of the graphical object (step 112).

Additionally, the process prepares for processing of all scan lines by setting up data structures for the first output scan line and obtaining the first run and the first run array (step 114). Next, the process iteratively operates on each scan line. Thus, in step 116, the process applies color or paint to the pixels of the current output scan line. Next, the process checks whether additional runs exist in the run array (step 178). If so, the next one is obtained (step 180) and the process loops back to step 116 to continue processing.

If all runs in the run array have been processed, the process proceeds to check whether additional run arrays exist for the output scan line (step 182). If so, the next run array is obtained (step 184) and one run is selected from the next run array (step 180) before looping back to step 116.

From step 182, in the event that all run arrays for the current output scan line have been processed, the process proceeds to check whether additional scan lines require processing (step 186). If so, the process proceeds to set up the next output scan line (step 188) before proceeding to step 184 to continue processing the run array. When all scan lines have been processed, the process of FIG. 2 exits.

Figure 3:
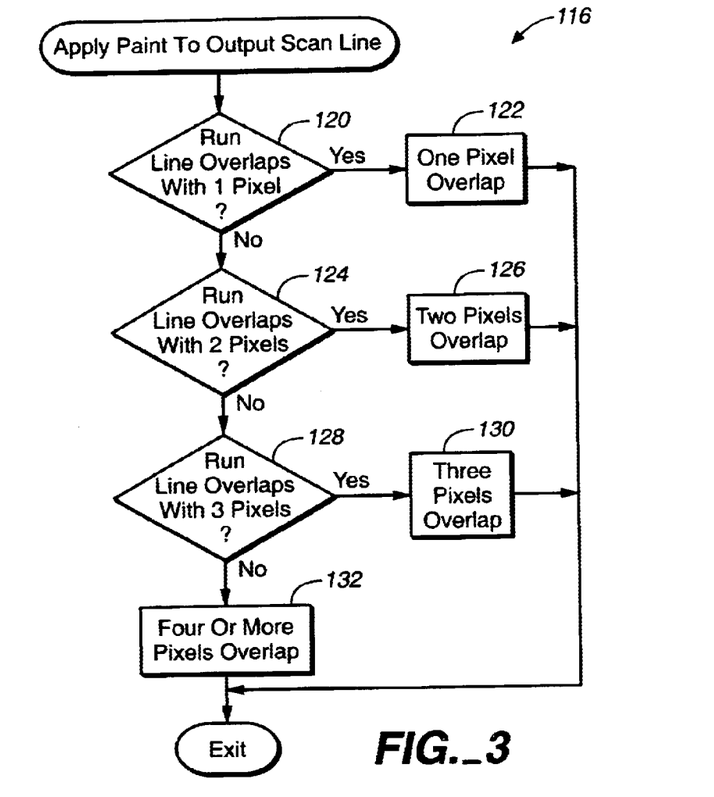
FIG. 3 is a flowchart illustrating a process for applying color to an output scan line.

FIG. 3 elaborates on step 116. In applying color or paint to the pixels, the process of FIG. 3 first checks for overlaps between the current run and pixels. First, in step 120, the process checks whether the current run overlaps with one pixel. If so, the process generates the output image in accordance with step 122 (described below in reference to FIG. 4) before exiting. In the event that the run overlaps with two pixels, the process proceeds in accordance with a two pixel overlapping algorithm step 126 (described below in reference to FIG. 6) before exiting.

From step 124, in the event that the run overlaps with 3 pixels (step 128), the process proceeds in accordance with a three pixel overlapping algorithm (step 130) before exiting. Otherwise, the process proceeds in accordance with four-or-more pixel overlapping algorithm (step 132) and exits.

Figure 4:
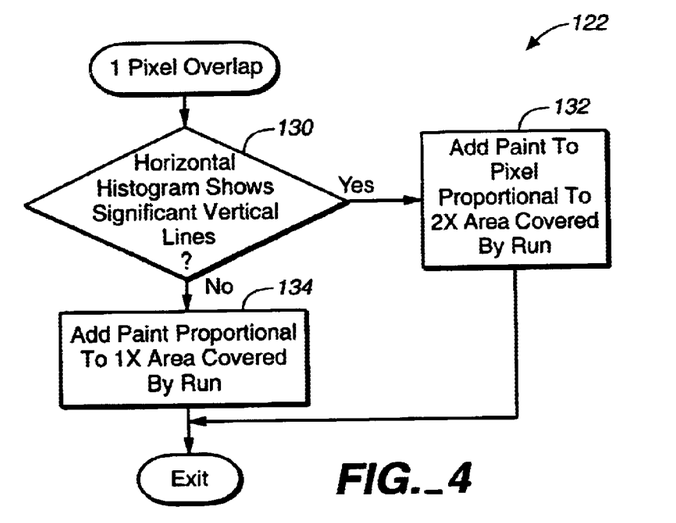
FIG. 4 is a flowchart illustrating a process for handling cases where runs overlap one pixel.

FIG. 4 illustrates a single pixel overlapping algorithm 122. The process first checks whether a horizontal histogram shows significant vertical lines (step 130). In one embodiment, a line is considered to exist and be significant where the histogram is twice the average histogram value. If so, paint is added to the pixel overlapped by the run in proportion to twice the area covered by the run (step 132). Alternatively, paint is added proportionally to the area covered by the run (step 134). From step 132 or 134, the process exits.

Figure 5:
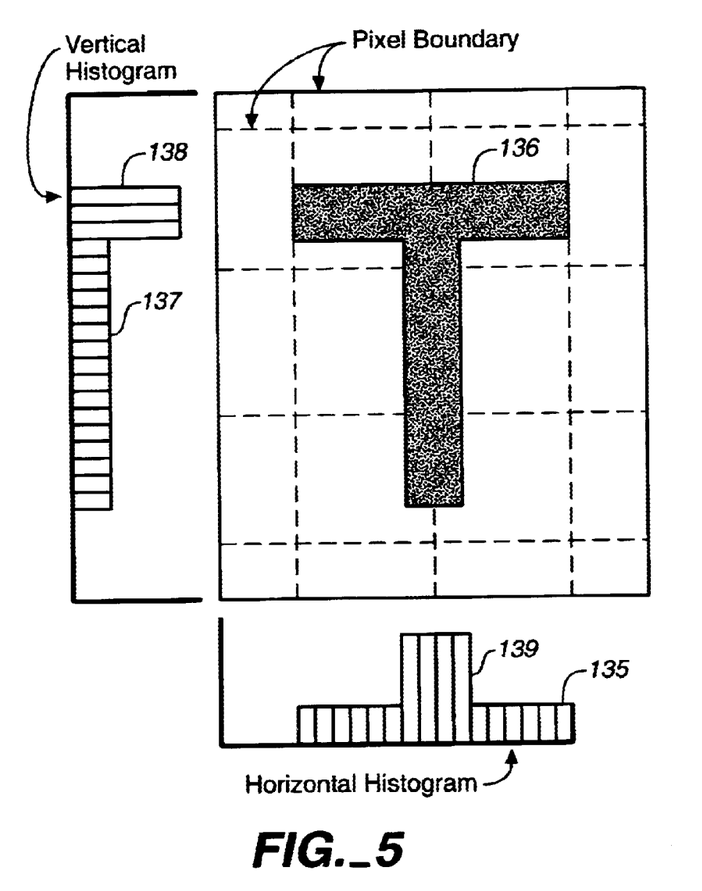
FIG. 5 is a diagram illustrating an exemplary character and associated horizontal and vertical histograms.

FIG. 5 is an exemplary diagram illustrating a glyph to be rendered onto a display device as well as various associated vertical and horizontal histograms. Histogram data can be generated in many ways. For example, an entire image of the graphical object can be rendered and each pixel of the image is placed in a corresponding grey level bin to generate the histogram. Alternatively, only a window or subsample of the entire graphical object may be captured to create a histogram so as to determine the background value and black threshold value of relevant portions of the graphical object.

As shown in FIG. 5, a glyph T 136 is straddled within a pixel boundary. Counts associated with run arrays associated with the T 136 are taken as a vertical histogram 137.

The example of FIG. 5 shows that the vertical histogram shows a high distribution in area 138 which is associated with the horizontal portion of the T 136. Similarly, a count is taken for horizontal runs is shown as a horizontal histogram 135 in FIG. 5. The horizontal histogram 135 shows a high distribution area 139 which is associated with the vertical stem of the T 136. The T 136 may be a large character (large, that is, with reference to pixel size in the destination resolution) having runs that overlap four or more pixels wide.

Figure 6:
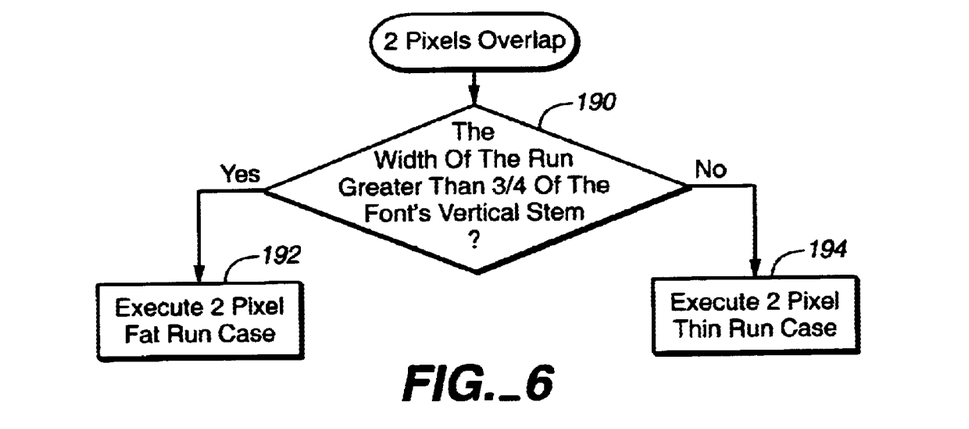
FIGS. 6–8 are flowcharts illustrating a process for handling cases where runs overlap two pixels.

FIG. 6 illustrates in more detail step 126 of FIG. 3. The process of FIG. 6 handles the event where a run overlaps two pixels. If the object is a character from a font that provides the information, this process checks if the width of the run is greater than 75% of the font's vertical stem or a stroked line's width (step 190). If so, the process executes a 2-pixel fat run procedure (step 192) which is described in more detail in FIG. 7. Otherwise, the process executes a 2-pixel thin run procedure (step 194) which is described in more detail in reference to FIG. 8. For other kinds of objects, or for glyphs from fonts not having stem width or line width values, another reference width or height can be used for the decision of step 190.

Figure 7:
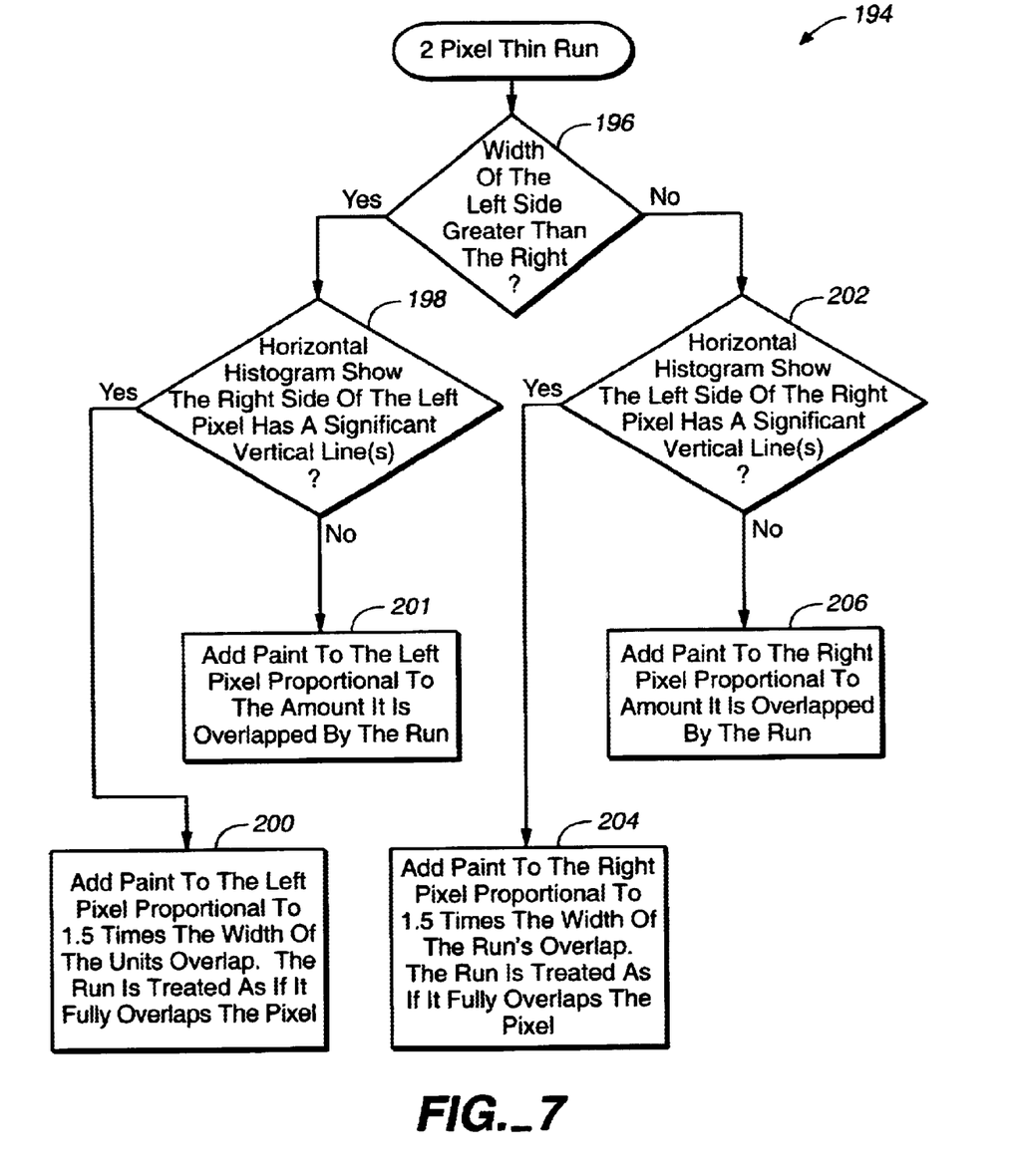

The 2-pixel thin run procedure is shown in more detail in FIG. 7. In this process, the run straddles two pixels. First, the width of the overlapping portion of the run with a left pixel is checked (step 196). If the width is greater for the left pixel than the right pixel, the process further checks whether the horizontal histogram shows that the right side of the left pixel indicates the presence of a significant vertical line (step 198). If so, paint is added to the left pixel proportional to about 1.5 times the width of the pixel (step 200) and the run is treated as though it fully overlaps the left pixel horizontally. If not, paint is added to the left pixel proportional to the amount the pixel overlaps the run (step 201).

From step 196, if the width of the left side is less than the width of the right side of the graphical object, the process further checks whether the horizontal histogram on the left side of the right pixel indicates the presence of significant a vertical line (step 202). If so, paint is added to the right pixel in an amount proportional to about 1.5 times the width of the run (step 204). Otherwise, the process adds paint to the right pixel in an amount proportional to the overlap of the run (step 206).

Figure 8:
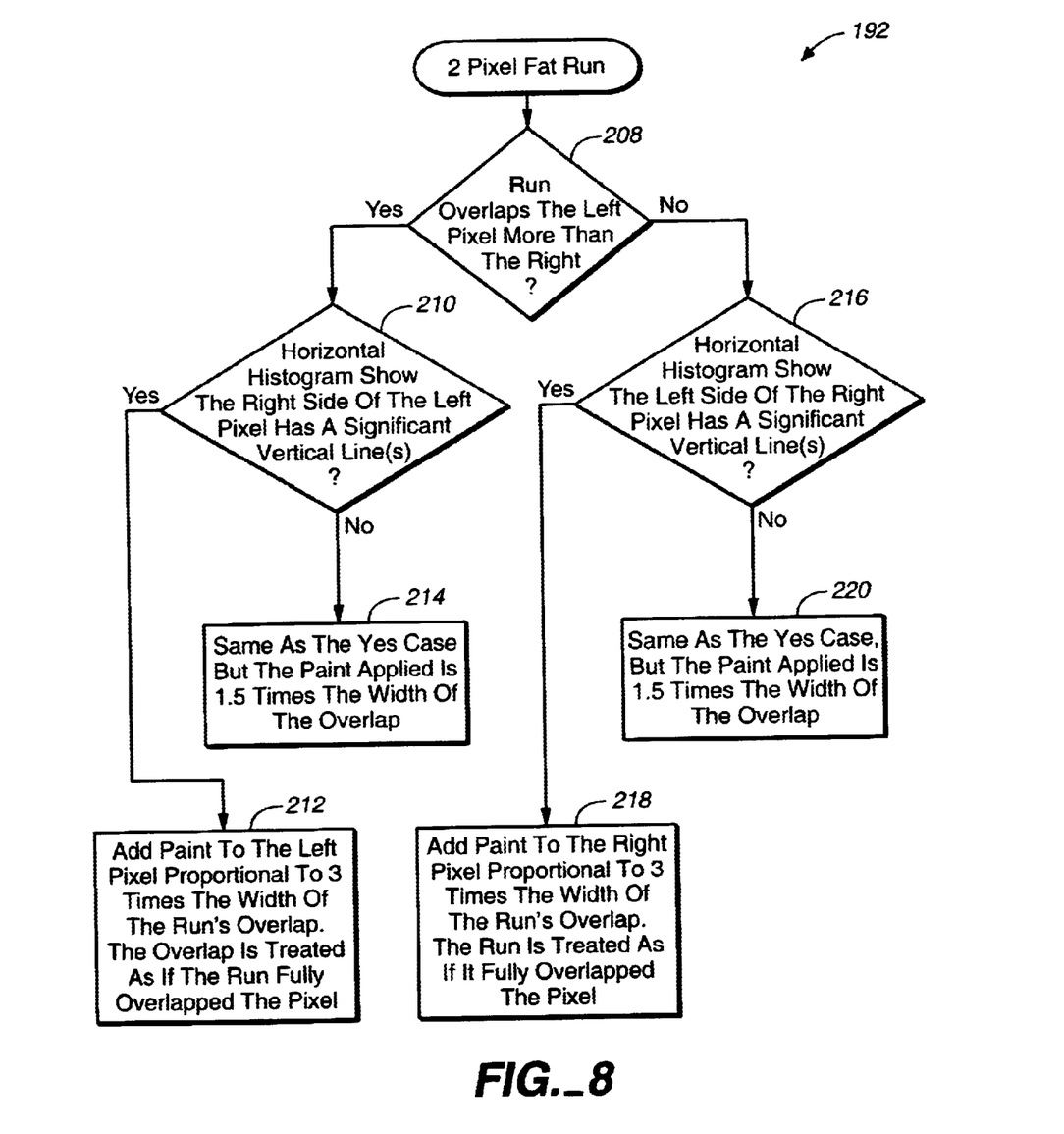

FIG. 8 illustrates the 2-pixel fat run procedure 192. First, the procedure checks whether the run overlaps the left pixel more than the right pixel (step 208). If so, the procedure further checks whether the horizontal histogram shows that the right side of the left pixel lies in a significant vertical line (step 210). If so, paint is added to the left pixel in an amount proportional to about three times the width of the run (step 212) and the overlap is treated as though it all extended over the left pixel. Otherwise, the process adds paint to the left pixel in an amount proportional to about 1.5 times the width of the run (step 214) and the overlap is also treated as though it all extended over the left pixel.

From step 208, if the run does not overlap the right pixel more than the left pixel, the process further checks whether the horizontal histogram on the left side of the right pixel indicates the presence of a significant vertical line (step 216). If so, paint is added to the left pixel in an amount proportional to about 3 times the width of the run (step 218) so that the run is treated as if it fully overlaps the right pixel horizontally. Otherwise, the process adds paint to the right pixel in an amount proportional to about 1.5 times the overlap of the run (step 220) and the run is treated as though it all extended over the right pixel.

Figure 9:
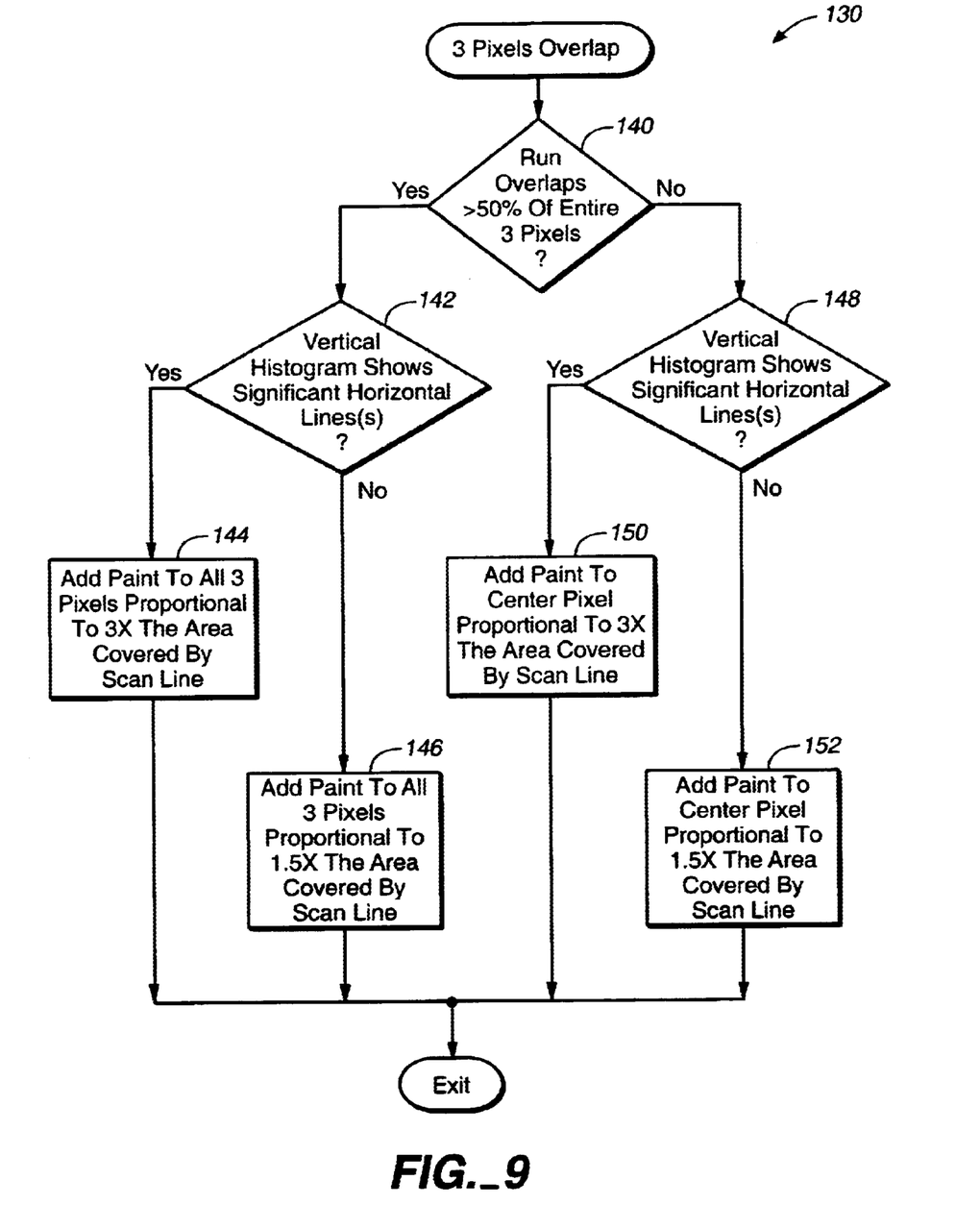
FIG. 9 is a flowchart illustrating a process for handling cases where runs overlap three pixels.

FIG. 9 illustrates in more detail step 130 of FIG. 3, which handles the event where a run overlaps three pixels, which means that the run crosses the entire horizontal width of one pixel and overlaps to some extent the neighboring pixel on each side. First, the process checks whether the run overlaps more than 50% of all three pixels (step 140). If so, the process then further checks whether a vertical histogram shows a significant horizontal line at the horizontal level of the pixels (step 142). If so, the process adds paint to each of the three pixels in proportion to about three times the area of the pixel covered by the run (step 144) before exiting.

From step 142, in the event that the vertical histogram does not show the presence of a significant horizontal line, the process proceeds to step 146 where it adds paint to all three pixels but only in proportion to about 1.5 times the area covered by the run before exiting.

From step 140, if the run overlaps less than 50% of all three pixels, the process then checks whether the vertical histogram shows the presence of a significant horizontal line at the horizontal level of the pixels (step 148). If so, the process adds paint to only the center pixel in proportion to about three times the area covered by the run (step 150) and exits. Otherwise, the process adds paint to the center pixel only, but now in proportion to approximately 1.5 times the area covered by the run (step 152) and exits.

Figure 10:
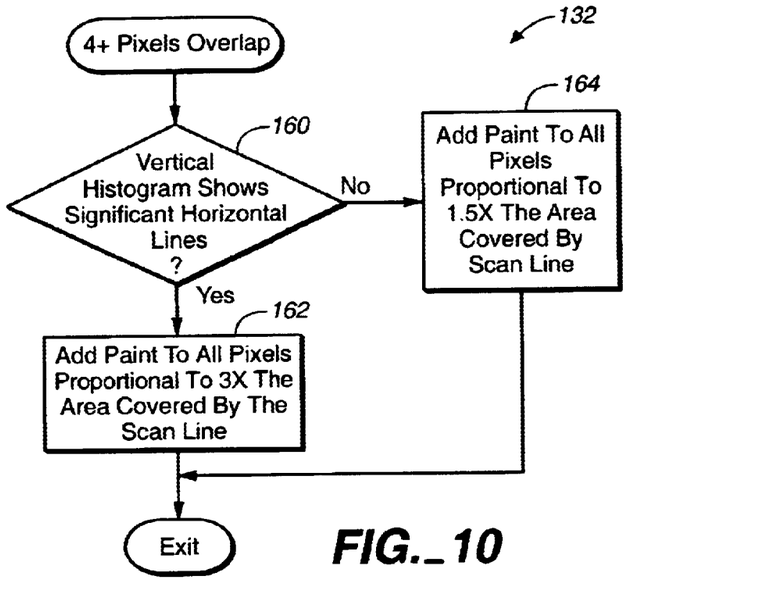
FIG. 10 is a flowchart illustrating a process for handling cases where runs overlap four or more pixels.

Referring now to FIG. 10, step 132 of FIG. 3 handles the event where the run overlaps four or more pixels. In this case, the process first determines whether the histogram values show the presence of a significant horizontal line (step 160). If so, the process fills each pixel with paint in proportion to about three times the area of the pixel covered by the run (step 162) and exits. Otherwise, the process adds paint to each of the four or more pixels in an amount proportional to about 1.5 times the area of the pixel covered by the run (step 164) and exits.

Figure 11:
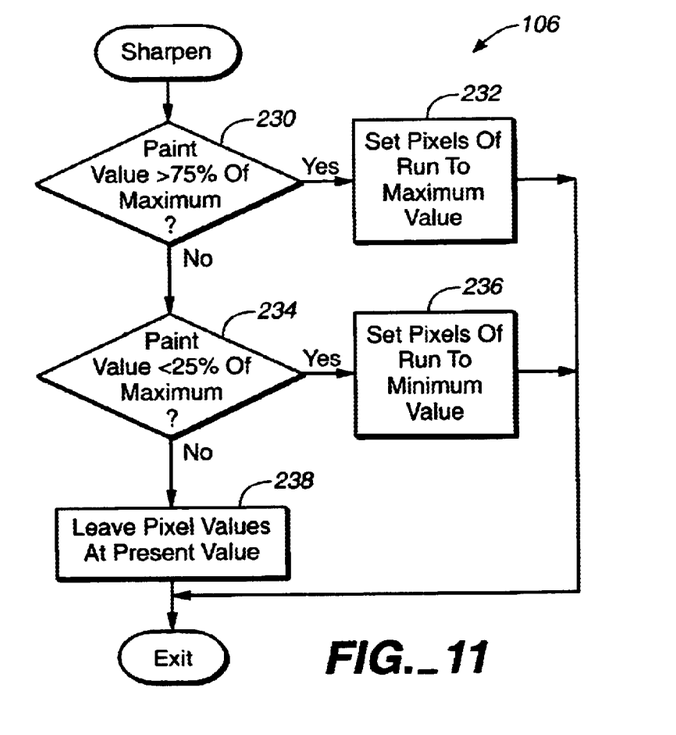
FIG. 11 is a flowchart illustrating a process for sharpening a rendered image.

Referring now to FIG. 11, the image sharpening step 106 of FIG. 1 first checks whether the pixel's paint value exceeds 75% of a predetermined maximum value (step 230). If so, the pixel of the current run is sent to the maximum value (step 232). In an embodiment handling grey scale displays with black text on a white background, the maximum value represents the black color. From step 232, the process of FIG. 11 exits.

If the paint value is not greater than 75% of the maximum value, the process of FIG. 11 then checks whether the paint value is less than 25% of the maximum value (step 204). If so, the pixel values are set to a minimum value (step 206). In an embodiment handling grey scale displays with black text on a white background, the minimum value corresponds to a white color.

From step 234, the event that the pixel value is in the range of 25% to 75% of the maximum value, the pixel values are left unchanged (step 238). Thresholds closer to, or farther away from, 100% and 0% can also be used in the sharpening step.

An exemplary embodiment is discussed next. In this embodiment, a glyph is rendered at eight times the final resolution in the vertical direction and stored as run arrays with fixed point precision horizontally. Therefore, for every line of output pixels, eight horizontal run arrays are generated. While fixed point numbers are used in this embodiment, any representation of a run can be used, including a bitmap representation where zero indicates a position on a scanline where no run exists and one indicates a run exists. A run would be a sequence of ones in this case.

While the vertical aspects of the graphical object is rendered at eight times final resolution, with 16-bit numbers denoting horizontal position, the fixed point precision is accurate to $\frac{1}{32767}$th of a pixel. The 8-times final resolution allows the resolution of finer vertical features of a font. A higher resolution value can be used at the cost of processor time. Conversely, a lower resolution value can be used as long as the degraded quality of the rendering is acceptable.

As mentioned above, any two adjacent runs within a run array will be separated by a certain minimum distance. Because the glyph has been rendered at eight times the output resolution, eight run arrays must be combined together to form one output horizontal line of pixels. Each run array contains zero or more start and stop positions for the application of paint to the output pixels. Pixels that contains the maximum amount of paint are completely opaque; pixels with less than maximum are semi-transparent or transparent.

For glyphs whose features are much larger than the size of a pixel, standard anti-aliasing is applied and the start and stop values determine how much paint to add to overlapping pixels. In the case where a pixel is fully overlapped by a run, $\frac{1}{8}$th of the maximum amount of paint the pixel can hold is added to the pixel. Partially overlapped pixels are painted in the same way as the fully overlapped case but the amount of paint is proportional to the runs' overlap with the pixel. The end result of this process is a set of pixels containing various amounts of paint representing the anti-aliased glyph.

For characters whose features approach the size of a pixel, the amount of paint added can be more than $\frac{1}{8}$th of the maximum in some cases. The amount of paint added may be increased or decreased depending on a number of factors. The factors include:

A) Does the run fall entirely within one pixel?
B) Does the run straddle two pixels?
C) Does the run straddle more than two pixels?
D) Is the run width close to the width of a vertical stem?
E) Does a histogram of the run widths along the Y-axis show a width which is more than twice the average run width for the run array?
F) For runs that fall entirely within one pixel, does a histogram indicate that it overlaps a large vertical line or lines?

In evaluating Factor E, a histogram of the run widths along the Y-axis of the glyph is made. For each run array the widths of its runs are summed together to derive the histogram value at a particular point on the Y-axis. The average value of all the individual values is calculated.

The end result for the small glyph process is a set of pixels with various amounts of paint representing the glyph in an anti-aliased form.

Additionally, the rendered image is sharpened, by use of the process described above in reference to FIG. 11, for example.

Although one image sharpening approach is discussed above, other image sharpening approaches can be used. For instance, a global sharpening approach may be used which applies the same amount of sharpening over the entire image, by using a linear or nonlinear filter, for example. An adaptive sharpening approach typically applies different amounts of sharpening to different image regions of the image. The amount of sharpening for an image region is based on the image properties in that region. Various adaptive image sharpening approaches can also be used. Some approaches choose the sharpening filter from a set of directional sharpening filters on a pixel by pixel or region by region basis in accordance with local image data characteristics. Others may adjust the sharpening filter adaptively based on the output of an edge detector that looks at local spatial features in the image. Still others apply the singular value decomposition to blocks of image data and modify the singular values to improve the image sharpness.

When the painted pixels are prepared for display, they can be blended with a background color or image. In this case, the amount of paint in each pixel determines its opacity (also referred to as its alpha value), and the color of each pixel is determined by processes independent of the present invention.

Improved text readability can be created by using the foregoing techniques to anti-alias text. The result is sharper text, with more contrast, readability, and more accurate color (in color managed systems). However, the techniques are not limited to traditional fonts. Any object representation with sufficient resolution can be used (such as a set of outlines, bitmaps, or other representation). Similarly, the techniques are not limited to use in computer-based font rendering and can be applied to television, hand held devices, printers, or VR display devices.

Figure 12:
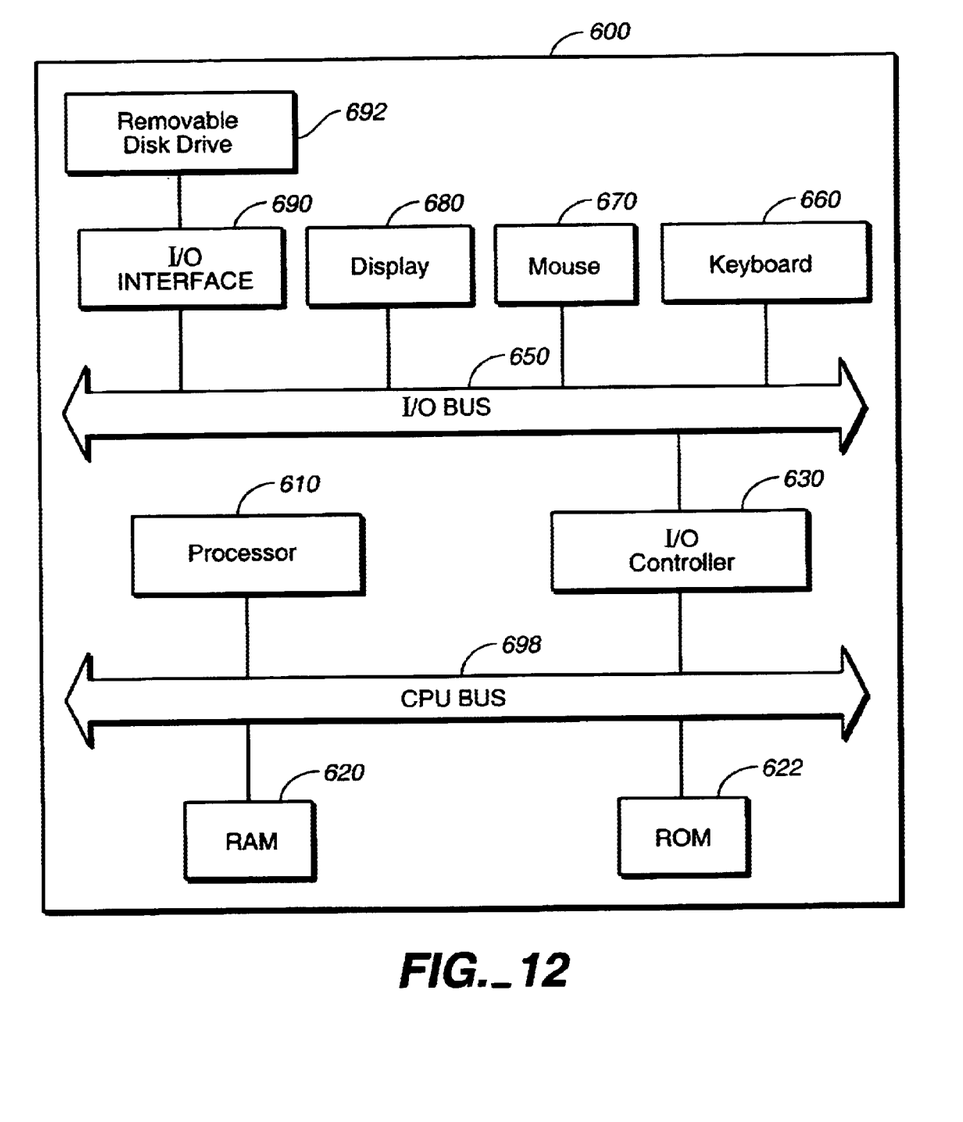
FIG. 12 is a block diagram of a programmable information processing system suitable for the invention.

The process of FIGS. 1–11 can be executed by a computer system. FIG. 12 illustrates one such computer system 600, including a CPU 610, a RAM 620, and an I/O controller 630 coupled by a CPU bus 698. The I/O controller 630 is also coupled by an I/O bus 650 to input devices such as a keyboard 660 and a mouse 670, and output devices such as a monitor 680.

Figure 13:
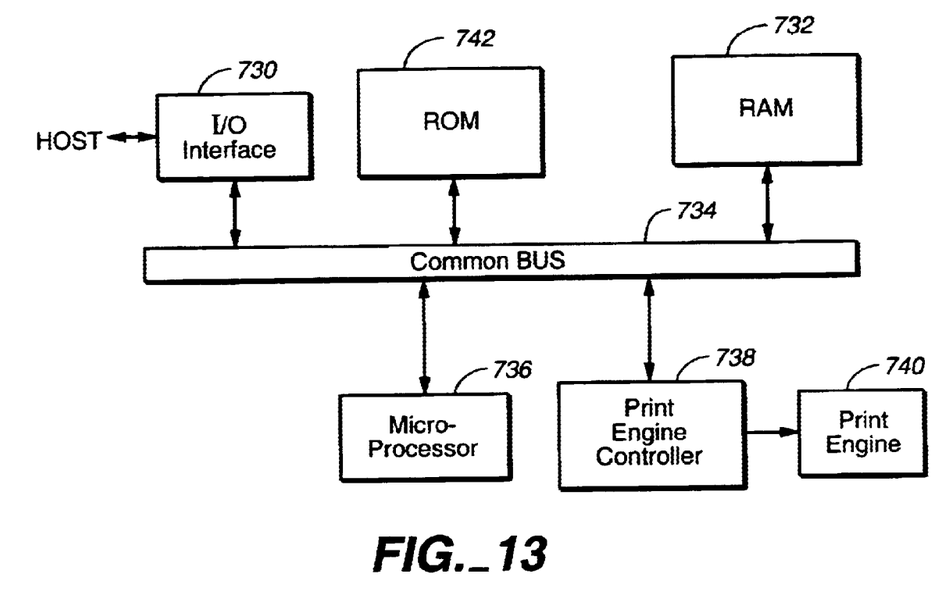
FIG. 13 is a schematic illustration of an output device.

FIG. 13 shows a typical printer driven by the computer system 600. Referring to FIG. 11, a printer embodying the invention includes an input/output (I/O) interface 730 for receiving vector or raster input over a cable or network from the host computer which outputs the vector or raster data to the common bus 734. Error messages and control information relating to the transfer of data is communicated back to the host over the I/O interface 730. As the raster data is received, it is stored in random access memory (RAM) 732 over the common bus 734. A microprocessor 736 on the common bus 734 provides the control for supplying the raster data to the print engine controller 738, which in turn passes the raster data to the electromechanical print engine 740 that applies the image to paper.

The program for the microprocessor 736 can be permanently stored in a read-only memory (ROM) 742. Input data and all other variable data can be stored in shared RAM 732. A standard commercial microprocessor, such as a member of the Motorola 68000 family or the Intel i960 family, can be used as the microprocessor 736. The RAM 732 is built using conventional dynamic random access memory (DRAM) semiconductor chips. Other conventional components are conventional commercial digital semiconductor chips or application specific integrated circuits (ASICs) known in the art and used with printed circuit interconnection technology.

In addition, the techniques of the invention are suitable for programming on, or implementation in, a graphics accelerator, including standard commercial 2D/3D processors such as the 3DFX Voodoo chip or the NVIDIA Riva TNT chip.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

The invention is not limited in its application to the details of the particular arrangement shown because the invention is capable of other embodiments. Also, the terminology used herein is for the purpose of description and not of limitation. Thus, while the invention has been shown and described with reference to an embodiment thereof, those skilled in the art will understand that the above and other changes in form and detail may be made without departing from the spirit and scope of the following claims.

What is claimed is:

1. A method for rendering a graphical object for display on a destination raster of pixels having a destination resolution, comprising:

rendering the graphical object at a resolution higher than the destination resolution to generate one or more pieces, the pieces in the aggregate representing the graphical object at the higher resolution, and each of the pieces having a position with respect to the destination raster, whereby each piece overlaps one or more pixels;

for each of the pieces, calculating a contribution made by the piece to each of one or more pixels according to a selected algorithm, the algorithm being selected by a process applying a plurality of factors, the calculating including applying statistical techniques to determined a spatial distribution of the graphical object; and aggregating all the contributions made to each pixel to determine a value for the pixel.

2. The method of claim 1, wherein the plurality of factors includes the positional relationship of the piece to the raster grid.

3. The method of claim 1, wherein the plurality of factors include a factor selected from a group consisting of the positional relationship of the piece to an object bounding box, the positional relationship of the piece to a glyph x-height, the positional relationship of the piece to a glyph cap-height, the relationship of the size of the piece to a font stem width, the presence of a pixel in a row or column associated with a high horizontal or vertical density of the graphical object, the position of the piece relative to a boundary of an adjacent object, and the number of pixels of the destination grid overlapped by the piece.

4. The method of claim 1, wherein the graphical object is a glyph.

5. The method of claim 1, wherein the rendering at a higher resolution generates pieces so that any pair of pieces that are adjacent in a first direction have at least a minimum distance between them.

6. The method of claim 5, wherein the first direction is a vertical direction.

7. The method of claim 5, wherein the first direction is a horizontal direction.

8. The method of claim 7, wherein each piece is a run with a start position and a stop position.

9. The method of claim 1, wherein a piece's contribution to a pixel is a linear finction of the amount of the pixel that the piece overlaps if the piece overlaps four or more pixels.

10. The method of claim 1, wherein a piece's contribution to a pixel, if the piece overlaps three or fewer pixels, is determined by a calculation that makes adjustments to the contribution according to one or more factors.

11. The method of claim 10, wherein one of the factors includes whether the piece falls within one pixel.

12. The method of claim 10, wherein one of the factors includes whether the piece straddles two pixels.

13. The method of claim 10, wherein one of the factors includes whether the piece straddles three pixels.

14. The method of claim 10, wherein one of the factors includes whether the piece straddles more than three pixels.

15. The method of claim 10, wherein the graphical object is a glyph from a font having a stem width and wherein one of the factors includes whether the piece is has a substantial width relative to the stem width.

16. The method of claim 15, wherein a width is substantial if it is at least 75% of the stem width.

17. The method of claim 10, further comprising:
generating a histogram representing a spatial distribution of the graphical object along an axis in the destination raster, wherein the contribution to a pixel is enhanced if the pixel is in a destination raster row or column corresponding to a histogram region that is higher than average.

18. The method of claim 17, wherein the histogram is calculated from the higher resolution rendering of the graphical object and a histogram region is deemed higher than average at points where the height is at least twice the average histogram height.

19. The method of claim 17, wherein the graphical object has a large vertical component, the method further comprising:
determining from the histogram whether a piece overlaps the large vertical component of the graphical object.

20. The method of claim 10, further comprising eliminating one or more pieces to enhance the separation of two graphical objects.

21. The method of claim 20, wherein the one or more pieces is eliminated to enhance a vertical separation of two graphical objects.

22. The method of claim 1, further comprising performing one of: moving pieces, deleting pieces and adding new pieces to an array of pieces.

23. The method of claim 1, further comprising sharpening the image in the destination raster of pixels.

24. The method of claim 23, wherein the sharpening step comprises setting the pixel value to a maximum value if the pixel value exceeds a predetermined maximum threshold.

25. The method of claim 23, wherein the sharpening step further comprises setting the value of a pixel to a minimum value if the pixel value is less than a predetermined minimum threshold.

26. The method of claim 1, wherein at least one pixel receives contributions calculated according to two or more distinct algorithms.

27. A system for rendering a graphical object for display on a destination raster of pixels having a destination resolution, comprising:
means for rendering the graphical object at a resolution higher than the destination resolution to generate one or more pieces, the pieces in the aggregate representing the graphical object at the higher resolution, and each of the pieces having a position with respect to the destination raster, whereby each piece overlaps one or more pixels;
means for calculating a contribution made by the piece to each of one or more pixels of the destination raster for each of the pieces, the calculation including applying statistical techniques to determine a spatial distribution of the graphical object; and
means for aggregating all the contributions made to each pixel to determine a value for the pixel.

28. A computer program tangibly stored on the computer-readable medium comprising instructions for causing the processor to:
render the graphical object at a resolution higher than the destination resolution to generate one or more pieces, the pieces in the aggregate representing the graphical object at the higher resolution, and each of the pieces having a position with respect to the destination raster, whereby each piece overlaps one or more pixels;
for each of the pieces, calculate a contribution made by the piece to each of one or more pixels according to a selected algorithm, the algorithm being selected by a process applying a plurality of factors, the calculation including applying statistical techniques to determine a spatial distribution of the graphical object; and
aggregate all the contributions made to each pixel to determine a value for the pixel.

29. A method for rendering an object for display on a destination raster of pixels having a destination resolution, comprising:
receiving an object;
receiving information specifying the destination resolution;
defining runs that represent the object at a resolution that is higher than the destination resolution, each run having a position with respect to the destination raster and overlapping one or more pixels of the destination raster;
for each pixel of the destination raster, identifying runs that overlap the pixel,
for each pixel of the destination raster, applying statistical techniques to determine a weight factor for each run identified as overlapping the pixel; and
for each pixel of the destination raster, calculating a pixel value from the weight factors of the runs identified as overlapping the pixel, the calculation not requiring information about the structure, shape, or meaning of the received graphical object.

30. The method of claim 29, wherein:

receiving an object includes receiving an object having dominant features; and applying statistical techniques to determine a weight factor for each run includes applying statistical techniques yielding greater weight factors for runs representing dominant features of the object than for runs not representing dominant features of the object.

31. The method of claim 29, wherein applying statistical techniques to determine a weight factor for a run includes applying statistical techniques to a spatial distribution of the run.

32. A computer program product, tangibly stored on a computer-readable medium, for rendering a graphical object for display on a destination raster of pixels having a destination resolution, comprising instructions operable to cause a programmable processor to:

render the graphical object at a resolution higher than the destination resolution to generate one or more pieces, the pieces in the aggregate representing the graphical object at the higher resolution, and each of the pieces having a position with respect to the destination raster, whereby each piece overlaps one or more pixels;

generate a histogram representing a spatial distribution of the graphical object along an axis in the destination raster;

for each of the pieces, calculate a contribution made by the piece to each of one or more pixels that the piece overlaps, wherein the contribution to a pixel is enhanced if the pixel is in a destination raster row or column corresponding to a histogram region that is higher than average; and aggregate all the contributions made to each pixel to determine a value for the pixel.

\* \* \* \* \*

UNITED STATES PATENT AND TRADEMARK OFFICE
CERTIFICATE OF CORRECTION

PATENT NO. : 6,614,432 B1
DATED : September 2, 2003
INVENTOR(S) : Peter Merrill

It is certified that error appears in the above-identified patent and that said Letters Patent is hereby corrected as shown below:

Title page,
Item [54], Title, replace "IMAGE RENDERING TECHNIQUE" with
-- STATISTICS-BASED IMAGE RENDERING --;

Column 10,
Line 57, replace "statistical techniques to determined" with -- histogram techniques to determine --;

Column 11,
Line 36, replace "piece is has a substantial" with -- piece has a substantial --;

Column 12,
Line 24, replace "statistical techniques" with -- histogram techniques --;
Line 42, replace "including applying statistical techniques" with -- including applying histogram techniques --.

Signed and Sealed this

Sixth Day of July, 2004

JON W. DUDAS
*Acting Director of the United States Patent and Trademark Office*